US011711476B2

(12) United States Patent
Kagawa

(10) Patent No.: US 11,711,476 B2
(45) Date of Patent: Jul. 25, 2023

(54) IMAGE FORMING SYSTEM THAT INSPECTS QUALITY OF AN IMAGE FORMED ON A SHEET

(71) Applicant: CANON KABUSHIKI KAISHA, Tokyo (JP)

(72) Inventor: Yosuke Kagawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/696,215

(22) Filed: Mar. 16, 2022

(65) Prior Publication Data

US 2022/0311890 A1 Sep. 29, 2022

(30) Foreign Application Priority Data

Mar. 24, 2021 (JP) ................................ 2021-050385
Feb. 15, 2022 (JP) ................................ 2022-021434

(51) Int. Cl.
*H04N 1/00* (2006.01)

(52) U.S. Cl.
CPC ..... *H04N 1/00702* (2013.01); *H04N 1/00045* (2013.01); *H04N 1/00588* (2013.01); *H04N 1/00631* (2013.01)

(58) Field of Classification Search
None
See application file for complete search history.

(56) References Cited

U.S. PATENT DOCUMENTS 8,848,244 B2 9/2014 Kaneko
2011/0075890 A1* 3/2011 Yasuda ............. H04N 1/00015 382/112
2013/0250319 A1* 9/2013 Kaneko ................. G06V 10/98 358/1.9
2013/0250369 A1* 9/2013 Kitai ...................... G06T 7/001 358/405
2013/0250370 A1* 9/2013 Kojima ............. H04N 1/00087 358/405
2014/0168709 A1* 6/2014 Tokumaru .............. G06T 7/001 358/1.18
2017/0270658 A1 9/2017 Kaneko
2021/0073967 A1* 3/2021 Imai ....................... G06T 7/001

FOREIGN PATENT DOCUMENTS

EP 2312530 A1 4/2011
EP 2642738 A1 9/2013
JP 2005-238817 A 9/2005

OTHER PUBLICATIONS

European Search Report dated Jul. 28, 2022, issued in European Patent Application No. 22162455.4.

* cited by examiner

*Primary Examiner* — Dung D Tran
(74) *Attorney, Agent, or Firm* — Venable LLP

(57) ABSTRACT

A first surface of a first sheet has a second image formed in advance. An image forming system generates reference data based on a result of reading an image on the first surface of the first sheet on which a first image is not formed, generates first image data that represents a result of reading an image on the first surface of the first sheet having the first image formed on the first surface, and determines, based on the reference data and the first image data, a relative position between the first image and the second image on the first surface of the first sheet.

16 Claims, 11 Drawing Sheets

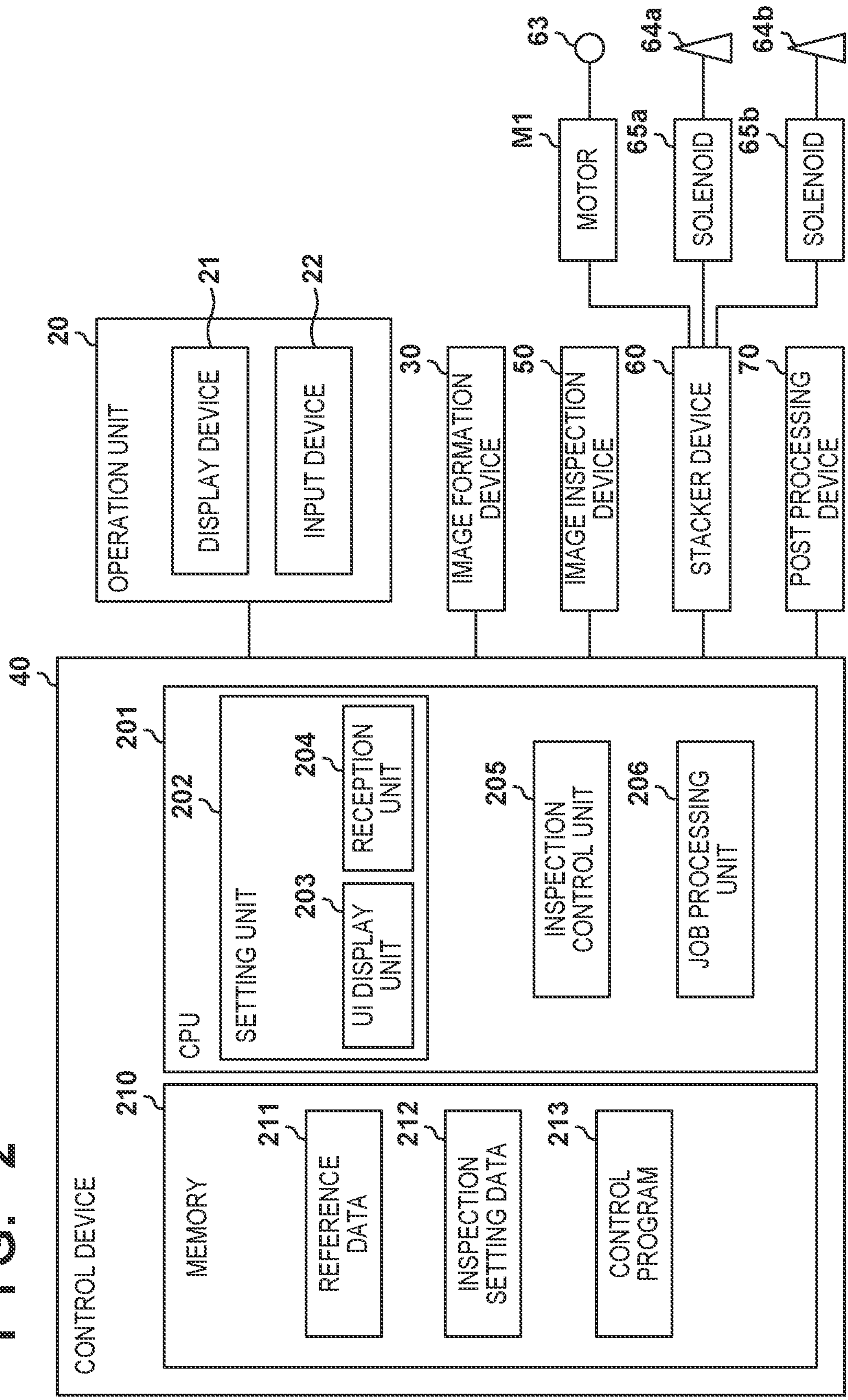
F I G. 2
CONTROL DEVICE
40
MEMORY
210
211
REFERENCE DATA
212
INSPECTION SETTING DATA
213
CONTROL PROGRAM
CPU
201
SETTING UNIT
202
203
UI DISPLAY UNIT
204
RECEPTION UNIT
205
INSPECTION CONTROL UNIT
206
JOB PROCESSING UNIT
20
OPERATION UNIT
21
DISPLAY DEVICE
22
INPUT DEVICE
30
IMAGE FORMATION DEVICE
50
IMAGE INSPECTION DEVICE
60
STACKER DEVICE
70
POST PROCESSING DEVICE
M1
MOTOR
63
65a
SOLENOID
64a
65b
SOLENOID
64b 51
INSPECTION CONTROLLER
301
CPU
302
INSPECTION UNIT
303
POSITION CORRECTION UNIT
304
OVERLAP DETERMINATION UNIT
305
DISPLACEMENT DETERMINATION UNIT
306
CONVEYANCE CONTROL UNIT
307
READING CONTROL UNIT
310
MEMORY
211
REFERENCE DATA
312
INSPECTION IMAGE DATA
212
INSPECTION SETTING DATA
313
CONTROL PROGRAM
53
M2
MOTOR
52a
IMAGE SENSOR
52b
IMAGE SENSOR

FIG. 4A

| | | | | | | | | | |
|---|---|---|---|---|---|---|---|---|---|
| 150 | 200 | 200 | 200 | 200 | 200 | 200 | 200 | 200 | 200 |
| 200 | 150 | 200 | 200 | 200 | 200 | 200 | 200 | 200 | 200 |
| 200 | 200 | 150 | 200 | 200 | 200 | 200 | 200 | 200 | 200 |
| 200 | 200 | 200 | 150 | 200 | 200 | 190 | 200 | 200 | 200 |
| 200 | 200 | 200 | 200 | 150 | 200 | 200 | 200 | 200 | 200 |
| 200 | 200 | 200 | 200 | 200 | 150 | 200 | 200 | 200 | 200 |
| 200 | 200 | 200 | 190 | 200 | 200 | 150 | 200 | 200 | 200 |
| 200 | 200 | 200 | 200 | 200 | 200 | 200 | 150 | 200 | 200 |
| 200 | 200 | 200 | 200 | 200 | 200 | 200 | 200 | 150 | 200 |
| 200 | 200 | 200 | 200 | 200 | 200 | 200 | 200 | 200 | 150 |

FIG. 4B

| | | | | |
|---|---|---|---|---|
| 1 | 0 | 1 | 0 | 1 |
| 0 | 0 | 0 | 0 | 0 |
| 1 | 0 | -8 | 0 | 1 |
| 0 | 0 | 0 | 0 | 0 |
| 1 | 0 | 1 | 0 | 1 |

FIG. 4C

| | | | | | |
|---|---|---|---|---|---|
| 255 | 0 | 0 | 0 | 0 | 0 |
| 0 | 255 | 0 | 0 | 80 | 0 |
| 0 | 0 | 255 | 0 | 0 | 0 |
| 0 | 0 | 0 | 255 | 0 | 0 |
| 0 | 80 | 0 | 0 | 255 | 0 |
| 0 | 0 | 0 | 0 | 0 | 255 |

FIG. 5A

| | | | | | | | | | |
|---|---|---|---|---|---|---|---|---|---|
| 0 | 0 | 0 | 0 | 1 | 1 | 0 | 0 | 0 | 0 |
| 0 | 0 | 0 | 1 | 0 | 0 | 1 | 0 | 0 | 0 |
| 0 | 0 | 1 | 1 | 1 | 1 | 1 | 1 | 0 | 0 |
| 0 | 1 | 0 | 0 | 0 | 0 | 0 | 0 | 1 | 0 |
| 1 | 0 | 0 | 0 | 0 | 0 | 0 | 0 | 0 | 1 |
| 0 | 0 | 0 | 0 | 0 | 0 | 0 | 0 | 0 | 0 |
| 0 | 1 | 1 | 0 | 0 | 0 | 0 | 0 | 0 | 0 |
| 0 | 1 | 1 | 0 | 0 | 0 | 0 | 1 | 1 | 0 |
| 0 | 0 | 0 | 0 | 0 | 0 | 1 | 1 | 0 | 0 |
| 0 | 0 | 0 | 0 | 0 | 0 | 0 | 0 | 0 | 0 |

FIG. 5B

| | | | |
|---|---|---|---|
| 0 | 0 | 0 | 0 |
| 0 | 1 | 1 | 0 |
| 0 | 1 | 1 | 0 |
| 0 | 0 | 0 | 0 |

FIG. 5C

| | | | | | | | | | |
|---|---|---|---|---|---|---|---|---|---|
| 0 | 0 | 0 | 0 | 1 | 1 | 0 | 0 | 0 | 0 |
| 0 | 0 | 0 | 1 | 0 | 0 | 1 | 0 | 0 | 0 |
| 0 | 0 | 1 | 1 | 1 | 1 | 1 | 1 | 0 | 0 |
| 0 | 1 | 0 | 0 | 0 | 0 | 0 | 0 | 1 | 0 |
| 1 | 0 | 0 | 0 | 0 | 0 | 0 | 0 | 0 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 6C

| 0 | 0 | 0 | 0 | 0 | ... | 0 |
|---|---|---|---|---|---|---|
| 0 | 1 | 1 | 0 | 0 | ... | 0 |
| 0 | 1 | 1 | 0 | 0 | ... | 0 |
| 0 | 0 | 0 | 0 | 0 | ... | 0 |
| 0 | 0 | 0 | 0 | 0 | ... | 0 |
| 0 | 0 | 0 | 0 | 0 | ... | 0 |
| ... | | | | | ... | ... |
| 0 | 0 | 0 | 0 | 0 | ... | 0 |

| Area 00 | Area 01 | Area 02 | Area 03 | ... | Area 0X |
|---|---|---|---|---|---|
| Area 10 | Area 11 | Area 12 | Area 13 | ... | Area 1X |
| Area 20 | Area 21 | Area 22 | Area 23 | ... | Area 2X |
| Area 30 | Area 31 | Area 32 | Area 33 | ... | Area 3X |
| Area 40 | Area 41 | Area 42 | Area 43 | ... | Area 4X |
| Area 50 | Area 51 | Area 52 | Area 53 | ... | Area 5X |
| ... | ... | ... | ... | ... | ... |
| Area Y0 | Area Y1 | Area Y2 | Area Y3 | ... | Area YX |

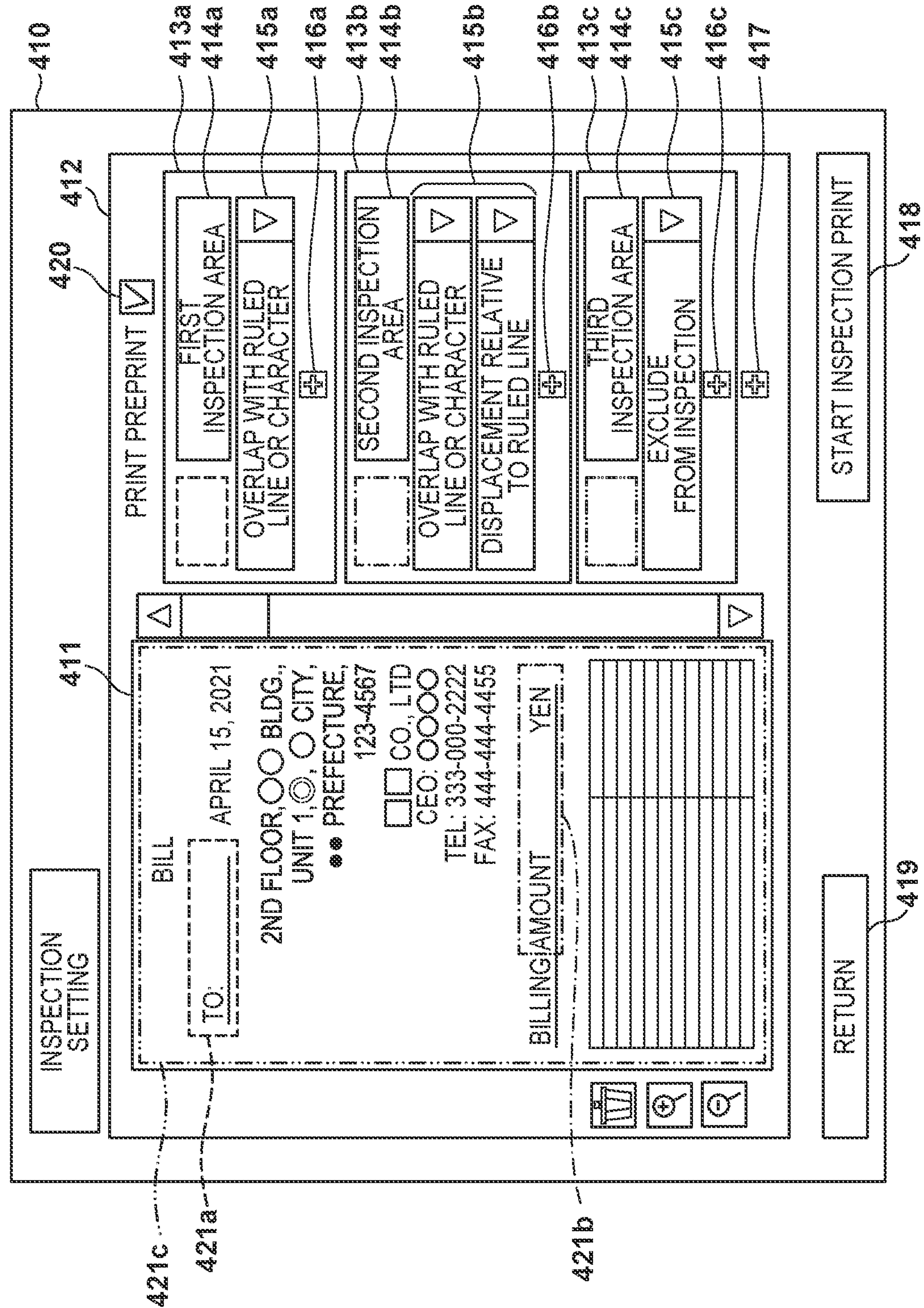

FIG. 7B
410
INSPECTION SETTING
411
412
420
PRINT PREPRINT
BILL
TO:
APRIL 15, 2021
2ND FLOOR,○○ BLDG.,
UNIT 1,◎, ○ CITY,
●● PREFECTURE,
123-4567
□□ CO., LTD
CEO: ○○○○
TEL: 333-000-2222
FAX: 444-444-4455
BILLING AMOUNT YEN
413a
414a
415a
416a
FIRST INSPECTION AREA
OVERLAP WITH RULED LINE OR CHARACTER
413b
414b
415b
416b
SECOND INSPECTION AREA
OVERLAP WITH RULED LINE OR CHARACTER
DISPLACEMENT RELATIVE TO RULED LINE
413c
414c
415c
416c
417
THIRD INSPECTION AREA
EXCLUDE FROM INSPECTION
START INSPECTION PRINT
418
RETURN
419
421a
421b
421c

501

BILLING AMOUNT 5000 YEN

START
ACCEPT INSPECTION SETTING
S601
S602
HAS INSPECTION BEEN INSTRUCTED ?
NO
YES
TRANSFER INSPECTION SETTING
S603
INSTRUCT INSPECTION
S604
RECEIVE INSPECTION RESULT
S605
SORT SHEET IN ACCORDANCE WITH INSPECTION RESULT
S606
END

START
STORE INSPECTION SETTING
S701
EXECUTES INSPECTION IN ACCORDANCE WITH INSPECTION SETTING
S702
TRANSMIT INSPECTION RESULT
S703
END 100
30
3Y
3M
3C
3K
1Y
2Y
4Y
1M
2M
4M
1C
2C
4C
1K
2K
4K
5Y
5M
5C
5K
R
a
6
7
8
11
12
P
17
40
20
50
51
52a
52b
53
60
61
62
63
64a
64b
70
71
72a
72b
73
74a
74b
74c
80
81
82
85
86
87

IMAGE FORMING SYSTEM THAT INSPECTS QUALITY OF AN IMAGE FORMED ON A SHEET

CROSS-REFERENCE TO RELATED APPLICATIONS

This application claims the benefit of Japanese Patent Application No. 2021-050385, filed Mar. 24, 2021, and Japanese Patent Application No. 2022-021434, filed Feb. 15, 2022, which are hereby incorporated by reference herein in their entirety.

BACKGROUND OF THE INVENTION

Field of the Invention

The present invention relates to an image forming system that inspects the quality of an image formed on a sheet.

Description of the Related Art

In recent years, it has become required to inspect the quality of an image formed on a sheet. Japanese Patent Laid-Open No. 2005-238817 proposes printing another image on a sheet (preprinted sheet) on which an image is printed in advance, and inspecting the print quality of the other image. According to Japanese Patent Laid-Open No. 2005-238817, the preprinted sheet is read by an image sensor in advance to generate reference data. Subsequently, the other image is additionally formed on the preprinted sheet and read by the image sensor, then, inspection data is generated. Finally, the print quality is determined based on the reference data and the inspection data.

Meanwhile, according to Japanese Patent Laid-Open No. 2005-238817, an area where an image is preprinted is masked, and the print quality is determined for an area of the entire area of the sheet excluding the masked area. In other words, according to Japanese Patent Laid-Open No. 2005-238817, relative position between the image preprinted on the sheet and the image additionally printed on the sheet is not taken into consideration. Thus, according to Japanese Patent Laid-Open No. 2005-238817, the inspection may result in a good result even when the positional relationship between the image preprinted on the sheet and the image additionally printed on the sheet is inappropriate.

SUMMARY OF THE INVENTION

The present invention provides an image forming system comprising an image forming unit configured to form a first image on a first surface of a first sheet, the first surface of the first sheet having a second image formed in advance, a reading unit provided on a downstream side of the image forming unit in a conveyance direction in which the first sheet is conveyed and configured to read an image on the first sheet conveyed, and at least one processor configured to generate reference data based on a result of reading, by the reading unit, an image on the first surface of the first sheet on which the first image is not formed, to generate first image data that represents a result of reading, by the reading unit, an image on the first surface of the first sheet having the first image formed on the first surface by the image forming unit and to determine, based on the reference data and the first image data, a relative position between the first image and the second image on the first surface of the first sheet on which the first image is formed.

Further features of the present invention will become apparent from the following description of exemplary embodiments (with reference to the attached drawings).

BRIEF DESCRIPTION OF THE DRAWINGS

FIG. 2 is an explanatory view of a control device;

FIGS. 4A to 4C are explanatory views of edge enhancement processing;

FIGS. 5A to 5C are explanatory views of binarization processing;

FIGS. 6A to 6C are explanatory views of processing of determining a character area;

FIGS. 7A and 7B are explanatory views of a setting screen;

DESCRIPTION OF THE EMBODIMENTS

Figure 1:
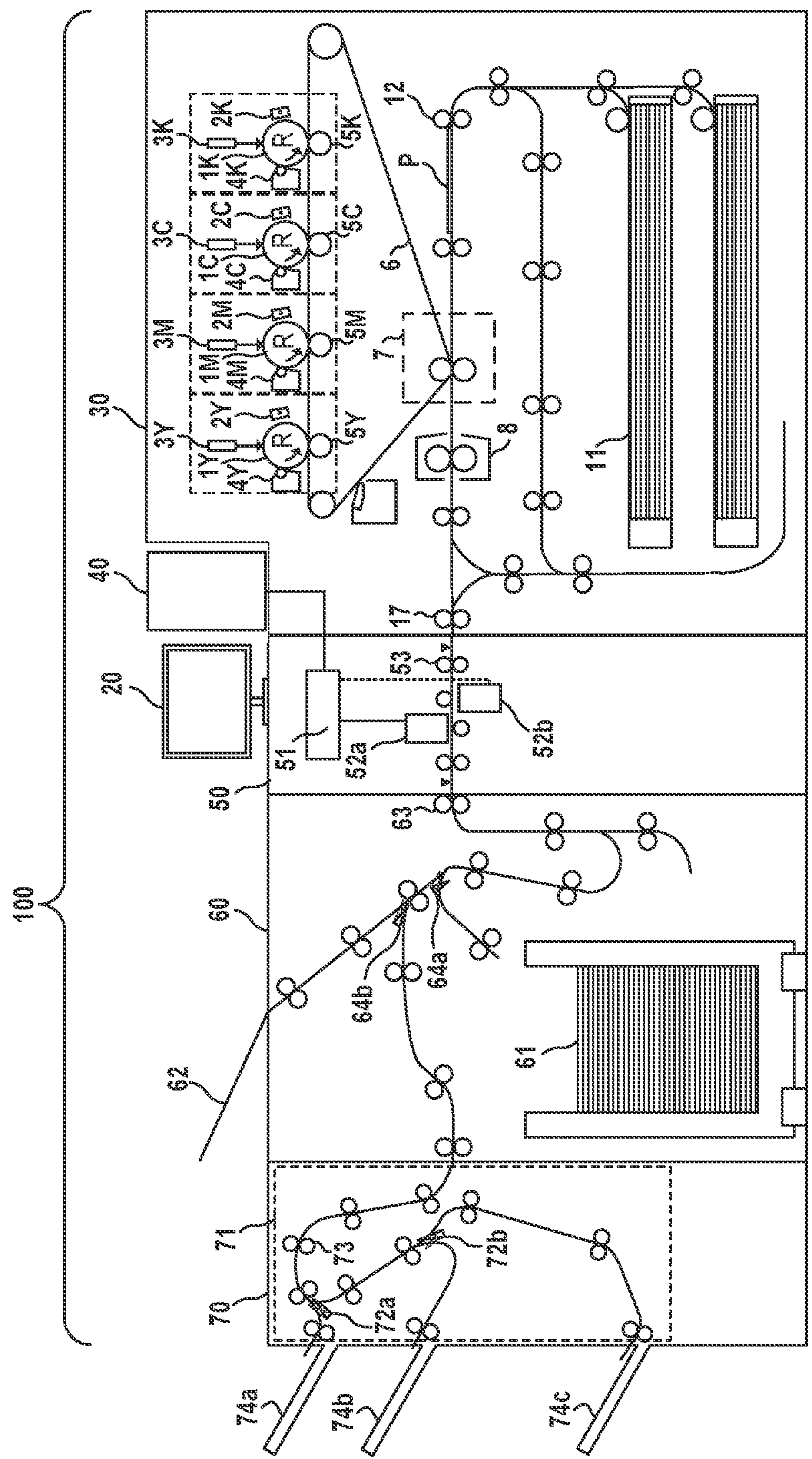
FIG. 1 is an explanatory view of an image inspection system.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

Image Forming System

An image forming system 100 according to the present embodiment is described below. As illustrated in FIG. 1, the image inspection system (image forming system) 100 includes an operation unit (operation panel) 20, an image formation device 30, a control device 40, an image inspection device 50, a stacker device 60, and a post processing device 70.

The operation unit 20 includes a display device that outputs information to the user and an input device (touch panel sensor for example) that accepts instructions from the user.

The image formation device 30 forms a toner image on a sheet P based on a YMCK color signal supplied from the control device 40. The characters YMCK attached to reference numerals respectively represent yellow, magenta, cyan, and black that are toner colors. In descriptions common to the four colors, the characters YMCK are not attached to the reference numerals.

A photosensitive member 1 is an image bearing member that bears electrostatic latent images and toner images. A charging unit 2 uniformly charges a surface of the photosensitive member 1. An exposure unit 3 irradiates a photosensitive member 1Y with a laser beam corresponding to a color signal supplied from the control device 40 to form an electrostatic latent image on the surface of the photosensitive member 1. A development unit 4 develops the electrostatic latent image using toner to form a toner image on a surface of the photosensitive member 1. A primary transfer roller 5Y transfers the toner image, formed on the surface of the photosensitive member 1, from the photosensitive member 1 to an intermediate transfer belt 6. Here, each of YMCK toner images is superimposed to form a color image. The intermediate transfer belt 6 conveys the toner images to a secondary transfer unit 7.

A sheet cassette 11 is a stocker that stores a large number of sheets P. Here, the sheets P stored in the sheet cassette 11 may each be a preprinted sheet that is a first sheet. The preprinted sheet is a sheet on which an image is formed in advance by the image formation device 30, other image formation devices, or the like. Typical examples of the preprinted sheet include a bill, a delivery slip, and the like. In the following, a case where the sheets P stored in the sheet cassette 11 are preprinted sheets will be described.

Conveyance rollers 12 feed the sheet P stored in the sheet cassette 11, and conveys the sheet P along a conveyance path.

The secondary transfer unit 7 transfers the toner images from the intermediate transfer belt 6 to the sheet P. A fixing unit 8 applies heat and pressure to the sheet P and the toner images, to fix the toner images on the sheet P. Discharge rollers 17 discharge the sheet P to the image inspection device 50.

The image inspection device 50 is a device configured to inspect the quality of an image formed on the sheet P. An inspection controller 51 reads the sheet P using an image sensor 52*a* and an image sensor 52*b* while conveying the sheet P using conveyance rollers 53. The image sensors 52*a* and 52*b* each includes a light source that illuminates the sheet P and a complimentary metal-oxide-semiconductor (CMOS) sensor. The inspection controller 51 generates image data corresponding to the result of reading the sheet P by the image sensors 52*a* and 52*b*.

The stacker device 60 conveys the sheet P, discharged from the image inspection device 50, using conveyance rollers 63. The stacker device 60 includes an NG tray 62 and a large-capacity tray 61. The sheet P the image quality of which is determined to be not good by the image inspection device 50 is stacked on the NG tray 62, for example. The control device 40 controls the image formation device 30 to form an image, which was formed on the sheet P and determined to be not good (NG) by the image inspection device 50, on a new sheet P (reprinting). The control device 40 may display an NG (not good) determination by the image inspection device 50 on a display device 21, to notify a user of the NG result.

The large-capacity tray 61 is a sheet stacking unit on which a large number of sheets P can be stacked. The stacker device 60 includes flappers 64*a* and 64*b* that switch the destination of the sheet P. The control device 40 controls the flappers 64*a* and 64*b* based on a print job and the image inspection result. The control device 40 may control the flappers 64*a* and 64*b* to output the sheet P to the post processing device 70.

The post processing device 70 conveys the sheet P using a plurality of conveyance rollers 73. The post processing device 70 includes an upper tray 74*a*, a middle tray 74*b*, and a lower tray 74*c* as sheet discharge trays. The control device 40 controls flappers 72*a* and 72*b* to discharge the sheet P onto any of the upper tray 74*a*, the middle tray 74*b*, and the lower tray 74*c*. The post processing device 70 may include a binding processing machine that bundles the sheets P, discharged from the stacker device 60, to make a sheet bundle, and staples and binds the sheet bundle. The post processing device 70 may include a bookbinding machine that folds the sheet bundle in two. The post processing device 70 may include a cutting machine that cuts the sheet bundle.

In the present embodiment, the sheets P determined to be good by the image inspection device 50 are stacked on the large-capacity tray 61, or are processed into a sheet bundle by the post processing device 70. According to known techniques, when one sheet P in a sheet bundle including hundreds of sheets P is determined to be not good, the entire sheet bundle is discarded. On the other hand, with the present embodiment, the sheet P determined to be not good is excluded from the sheet bundle, whereby the sheet bundle would not be wasted. Thus, the present embodiment contributes to the effective resource utilization.

Next, a control configuration in the image forming system 100 will be described. FIG. 2 illustrates details of the control device 40. A CPU 201 realizes a plurality of functions by executing a control program 213 stored in a memory 210. The CPU 201 may include a plurality of processors or CPU cores. Some or all of the plurality of functions realized by the CPU 201 may be realized by a hardware circuit different from the CPU 201. The memory 210 is a storage device including a read only memory (ROM), a random access memory (RAM), a solid state drive (SSD), a hard disk drive (HDD), and the like.

Figure 3:
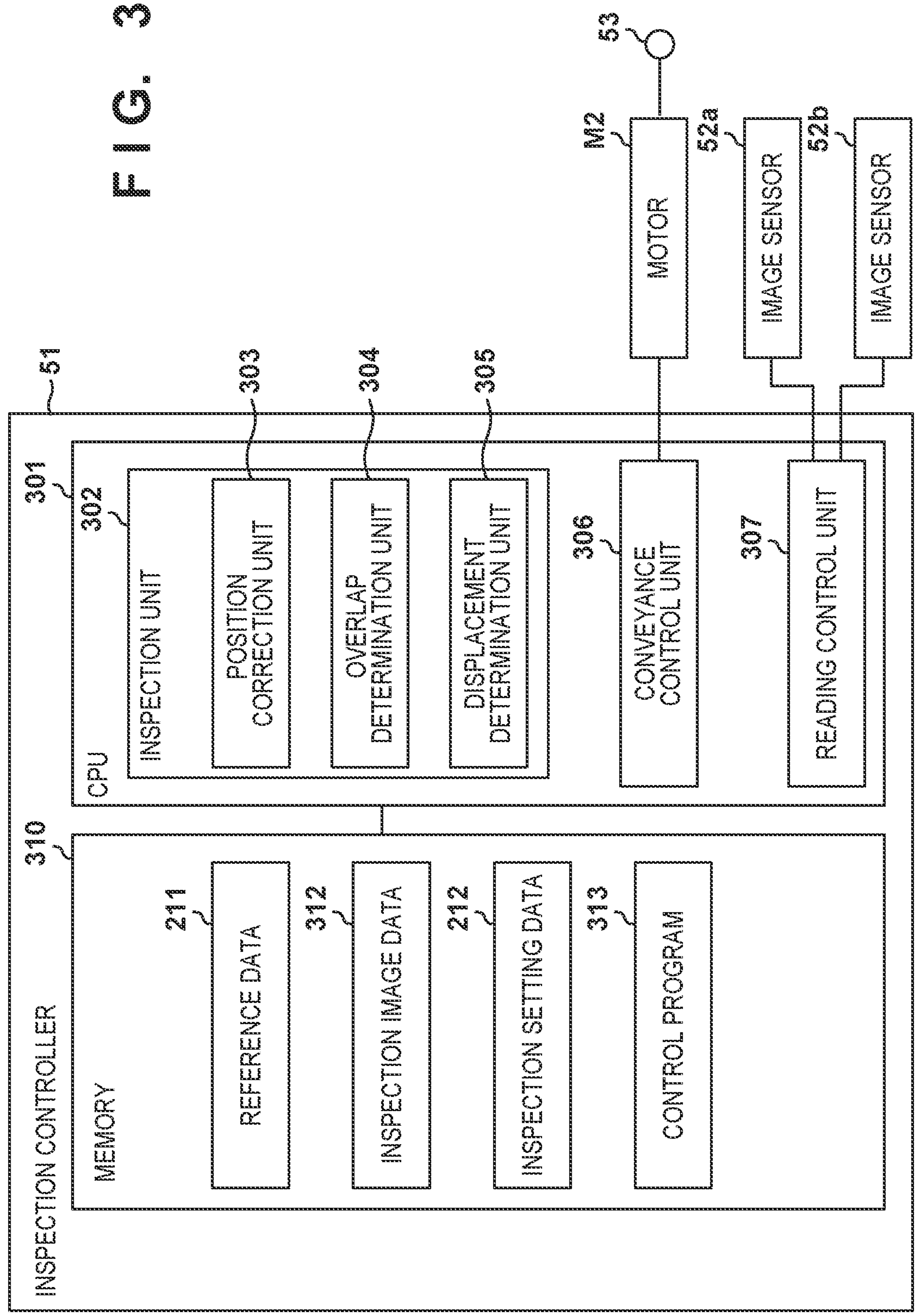
FIG. 3 is an explanatory view of an image inspection device.

FIG. 3 illustrates details of the inspection controller 51. A CPU 301 realizes a plurality of functions by executing a control program 313 stored in a memory 310. Some or all of the plurality of functions may be realized by a hardware circuit. The memory 310 is a storage device including a ROM, a RAM, an SSD, an HDD, and the like.

A UI display unit 203 of a setting unit 202 displays a user interface (UI) required for image inspection settings, on the display device 21 of the operation unit 20. A reception unit 204 of the setting unit 202 accepts an operation or instruction on the user interface from an input device 22.

Reference Data Generation

A method of generating reference data 211 serving as a reference image for image inspection will be described below.

When the instruction to generate the reference data 211 is input to the control device 40 via the display device 21, the control device 40 controls the image formation device 30 to convey the sheet P that is a preprinted sheet stored in the sheet cassette 11. Note that when the sheet P is conveyed to generate the reference data 211, the image formation device 30 does not form an additional image on the sheet P, the additional image is a first image to be formed by the image formation device 30 in an inspection job described later.

When the instruction to generate the reference data 211 is input to the control device 40 via the display device 21, the control device 40 controls the image inspection device 50 to read the image on the sheet P conveyed from the image formation device 30.

The inspection controller 51 generates the reference data 211 based on the image data that is a result of the image sensors 52*a* and 52*b* reading the sheet P conveyed thereto without having the image formed thereon by the image formation device 30, and stores the reference data 211 in the memory 310. Note that the inspection controller 51 may generate the reference data 211 based on an average value of the image data (pixel values) of a plurality of sheets P read by the image sensors 52*a* and 52*b*.

The control device 40 receives the reference data 211 from the inspection controller 51 and stores the reference data 211 in the memory 210. The UI display unit 203 may display the image represented by the reference data 211 on the display device 21.

Image Inspection

Next, a method of inspecting an image based on the reference data 211 will be described. Note that, in the present embodiment, after the reference data 211 is generated, the inspection job starts (that is, an additional image is formed on the sheet P stacked on the sheet cassette 11). However, this should not be construed in a limiting sense.

The control device 40 stores, in the memory 210, inspection setting data 212 that is information on image inspection set by the user via the display device 21. The control device 40 transfers the inspection setting data 212 to the image inspection device 50. The inspection setting data 212 will be described later.

When an instruction to start the inspection job for forming an image on the sheet P and inspecting the image formed is input to the control device 40 via the display device 21, the control device 40 controls various devices such as the image formation device 30, the stacker device 60, and the post processing device 70.

Specifically, the control device 40 controls the image formation device 30 to convey the sheet P that is a preprinted sheet stored in the sheet cassette 11. Furthermore, the control device 40 controls, for example, the image formation device 30 to print an image, corresponding to image data input from an external device such as a PC or a tablet, on the sheet P.

A conveyance control unit 306 provided to the inspection controller 51 drives a motor M2 to rotate the conveyance rollers 53. A reading control unit 307 provided to the inspection controller 51 controls the image sensors 52*a* and 52*b* to read the sheet P and to generate image data. The image sensor 52*a* reads a first surface of the sheet P, and the image sensor 52*b* reads a second surface of the sheet P on the side opposite to the first surface. Thus, with the present embodiment, the image inspection can be executed on both surfaces of the sheet P.

The stacker device 60 drives a motor M1 in accordance with a control instruction from the control device 40, to rotate the conveyance rollers 63. The stacker device 60 drives solenoids 65*a* and 65*b* in accordance with the control instruction from the control device 40 to switch the flappers 64*a* and 64*b*. As a result, the sheet P is guided and conveyed to any of the NG tray 62, the large-capacity tray 61, or the post processing device 70. For example, when the result of the image inspection by the image inspection device 50 is NG, the control device 40 controls the stacker device 60 to discharge the sheet P, determined to be NG, to the NG tray 62. The image formation device 30 and the post processing device 70 also include a solenoid that drives a flapper and a motor that drives a conveyance roller.

Position Correction Unit

A position correction unit 303 of an inspection unit 302 performs position correction for the result of reading by the image sensors 52*a* and 52*b*. When the sheet P is read by the image sensors 52*a* and 52*b* while being skewed, the sheet P may be skewed in the read image. Also, the leading edge of the sheet P may be deviated from the ideal position in the read image. Thus, the position correction unit 303 corrects the position of the read image by rotating the read image, or shifting the position of the read image to make the position of the leading edge of the sheet P in the read image match the ideal position.

Overlap Determination Unit

An overlap determination unit 304 determines, based on the reference data 211 and inspection image data 312 that is image data after the correction by the position correction unit 303, whether a preprinted image that is a second image printed on the sheet P before an image is formed on the sheet P by the image formation device 30 in the inspection job overlaps with the image (after here, referred to as an additional image) that is formed on the sheet P by the image formation device 30 in the inspection job. For example, whether an additional image of a character overlaps with respect to a preprinted image of a ruled line and a character is determined. Specifically, the overlap determination unit 304 calculates, for example, a difference between the pixel value (luminance value) in the reference data 211 and the pixel value in the inspection image data 312, and determines whether the images overlap based on the difference. More specifically, the overlap determination unit 304 determines that the additional image of a character overlaps with the preprinted image of a ruled line or a character, when the difference between the pixel values of the reference data 211 and the inspection image data 312 is equal to or greater ager than a first predetermined value. The overlap determination unit 304 determines that the additional image of a character does not overlap with the preprinted image of a ruled line or a character, when the difference between the pixel values of the reference data 211 and the inspection image data 312 is less than the first predetermined value. This is based on a characteristic that the pixel value in a portion where the additional image of a character overlaps with the preprinted image of a ruled line and a character is smaller than the pixel value in a portion where the additional image of a character does not overlap with the preprinted image of a ruled line and a character.

Displacement Determination Unit

When the additional image of a character does not overlap with the preprinted image of a ruled line and a character, a displacement determination unit 305 determines whether the additional image of a character area is displaced with respect to the preprinted image of a ruled line, and the like, by a predetermined amount or more. Specifically, for example, the displacement determination unit 305 calculates the distance between the preprinted image of a ruled line and the additional image of a character area, and determines that the additional image of the character area is displaced with respect to the preprinted image of the ruled line, and the like, when the distance exceeds a second predetermined value. The displacement determination unit 305 determines that the additional image of a character area is not displaced with respect to the preprinted image of a ruled line, and the like, when the distance between the preprinted image of the ruled line and the additional image of the character area does not exceed the second predetermined value. Note that, if the distance is within a predetermined range, the displacement may be determined to be tolerable. If the distance does not fall within the predetermined range, the displacement may be determined to be intolerable.

A method of detecting a character area performed by the displacement determination unit 305 will be described below.

The displacement determination unit 305 calculates an average luminance value in a predetermined area (for example, an area that is 7 pixels in an X direction and 7 pixels in a Y direction), based on luminance values included in the image data. The coordinate of a pixel of interest in a main scanning direction, which is a direction in which light-receiving elements of the image sensors 52*a* and 52*b* are arranged, is defined as X. The coordinate of the pixel of interest in a sub scanning direction corresponding to the conveyance direction in which the sheet P is conveyed is defined as Y. When reference is made to three pixels each before and after the pixel of interest in both the main scanning direction and the sub scanning direction, an average luminance value AVE2 is calculated based on the following formula.

$$AVE2[X][Y] = \frac{1}{49} \times \sum_{A=X-3}^{X+3} \sum_{B=Y-3}^{Y+3} INPUT[A][B]$$

The displacement determination unit 305 performs edge enhancement processing on image data acquired, to detect a character area and a dotted area in the image data. When three pixels each before and after the pixel of interest in both the main scanning direction and the sub scanning direction are multiplied by a 7×7 filter coefficient K, a luminance value EDGE of the image data after the edge enhancement is calculated based on the following formula.

$$\mathrm{EDGE}[X][Y]=\Sigma_{A=X-3}^{X+2}\Sigma_{B=Y-3}^{Y+3}\mathrm{INPUT}[A][B]\times K[A][B]$$

FIG. 4A to FIG. 4C are explanatory views of the edge enhancement processing. FIG. 4A illustrates an image corresponding to read data with the background having a luminance value "200", a diagonal line having a luminance value "150", and an isolated point having a luminance value "190". The size of the image is 10×10 pixels. FIG. 4B illustrates an edge enhancement filter having a size of 5×5 pixels. FIG. 4C illustrates a luminance value of image data after performing convolution calculation processing based on the edge enhancement filter. Values as a result of convolution processing that are equal to or less than zero are clipped to "0". Values as a result of convolution processing that are equal to or greater than 255 are clipped to "255".

The read data (FIG. 4C) after the convolutional calculation processing has the luminance value of the diagonal line being "255" due to the edge enhancement. The luminance value of the background is "0" due to edge enhancement. The edge is extracted in this manner. The isolated point with a small difference in luminance relative to the luminance value of the background is not significantly enhanced after edge enhancement, and has the luminance value "80".

The displacement determination unit 305 compares a difference between the average luminance value AVE2 and the luminance value EDGE to a threshold THedge. The displacement determination unit 305 outputs binarized data BIN that takes a value "1" when the difference is equal to or less than the threshold THedge. The displacement determination unit 305 outputs binarized data BIN that takes a value "0" when the difference is greater than the threshold THedge. With such binarization processing, information such as characters clearly printed on an original document, or dots of dot printing is enhanced and extracted. The displacement determination unit 305 makes binarization determination using the following formula.

$$\text{if } |\mathrm{EDGE}[X][Y]-\mathrm{AVE}\ 2[X][Y]| \le TH_{edge}, \mathrm{BIN}=1$$

$$\text{else } |\mathrm{EDGE}[X][Y]-\mathrm{AVE}\ 2[X][Y]| > TH_{edge}, \mathrm{BIN}=0$$

In the example illustrated in FIG. 4C, binarization processing is executed resulting in the threshold THedge being "100", a pixel with a difference that is equal to or greater than 100 being "0", and a pixel with a difference being equal to or less than 99 being "1". With this processing, only the pixels including the diagonal line have the value BIN=1, so that the diagonal line can be extracted.

The displacement determination unit 305 detects a group of pixels in an isolated state without any pixel with the value BIN=1 in the periphery, such as dots formed on the sheet P. The displacement determination unit 305 prepares in advance, a pattern matching image in which an image for when dots are read is envisioned, and detects an area in which an image matching the pattern matching image is found, as the group of pixels in the isolated state. The displacement determination unit 305 changes the values of the binarized data BIN of the group of pixels thus detected from "1" to "0". With such processing, dotted portions can be removed from the binarized data.

FIG. 5A is a diagram illustrating an example of the binarized data BIN. Specifically, FIG. 5A illustrates an example of the binarized data BIN including a character "A" and a dotted area in which 2×2 dots are printed. FIG. 5B illustrates an example of a pattern matching image for detecting the 2×2 dots. FIG. 5C illustrates an example of binarized data after the dotted area has been removed.

The binarized data BIN illustrated in FIG. 5A includes two areas matching the pattern matching image (areas surrounded by bold frames in FIG. 5A). The binarized data in FIG. 5C is obtained by changing the binarized data BIN of these areas from "1" to "0".

In this example, the character "A" is remaining with the 2×2 dotted areas removed, meaning that only the character area is extracted with the dotted areas removed. The displacement determination unit 305 determines that pixels set to "1" in binarized data DOT as a result of removing the dotted areas as illustrated in FIG. 5C, as the character area.

The displacement determination unit 305 performs area mapping with an image read by the image sensor sectionalized into areas of a predetermined size (such as, for example, rectangular areas having a size of 32×32 pixels), to detect the character area. FIG. 6A to FIG. 6C are diagrams illustrating processing of determining the character area.

The displacement determination unit 305 determines whether each mapped area includes a pixel with the binarized data DOT being "1". The displacement determination unit 305 determines the area including the pixel with the binarized data DOT being "1" as an area including a "character". In the example illustrated in FIG. 6B, the character "A" is printed in a range of Area 11, Area 12, Area 21, and Area 22. These areas include the pixels with the binarized data DOT being "1", and, thus, a character is determined to be included in an area surrounded by a bold frame.

The method of determining the character area is not limited to the method described above. For example, a method of determining the character area using a trained model that has been trained in advance may be used.

Inspection Content Setting

Figure 7A:
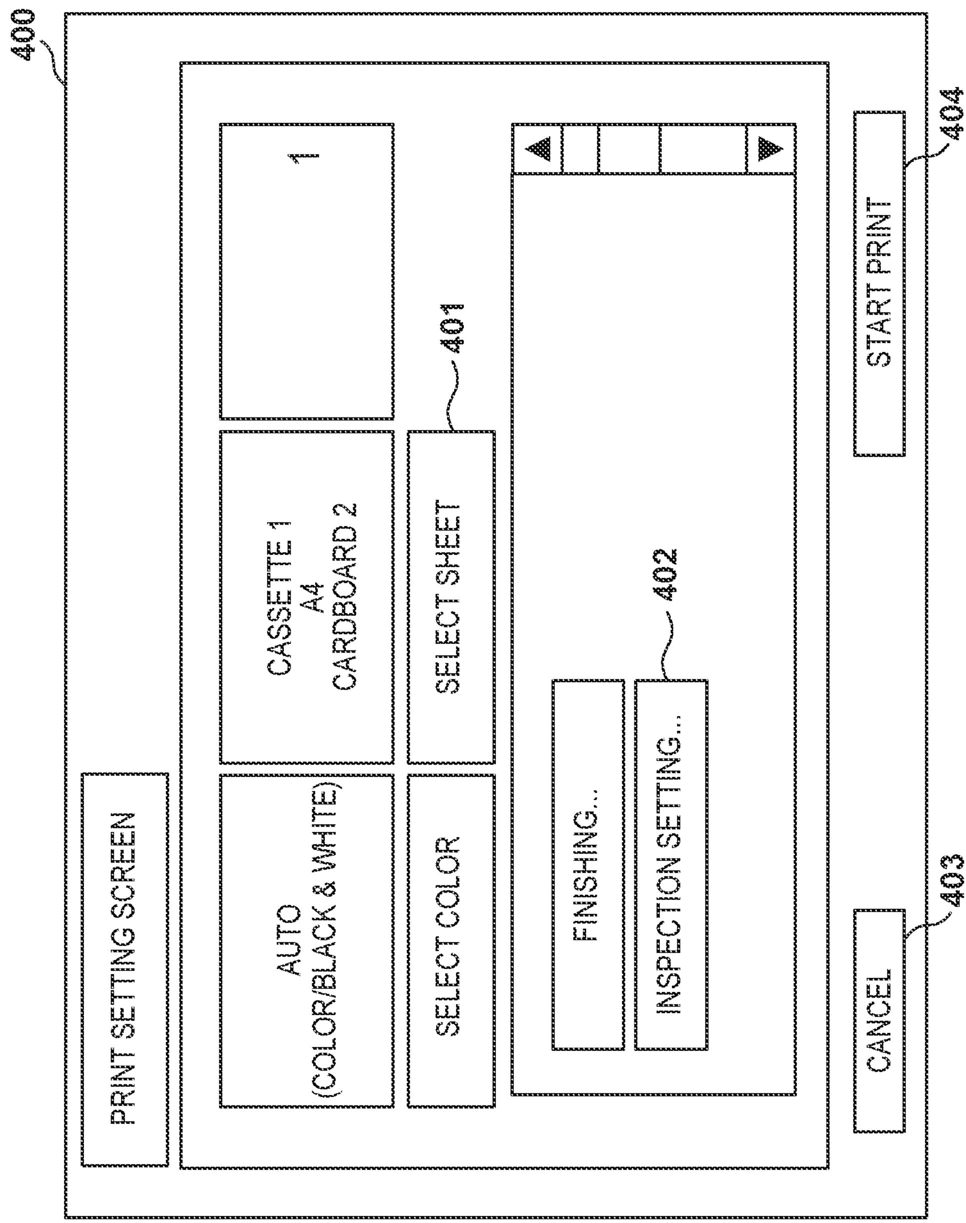

FIG. 7A illustrates an example of a print setting screen 400. FIG. 7B illustrates an example of an inspection setting UI 410. The CPU 201 displays the print setting screen 400 on the display device 21, in accordance with the control program 213. The inspection content may indicate the inspection processing (inspection job), or may indicate conditions or information for setting or defining the inspection processing.

The print setting screen 400 includes a sheet selection button 401. When the sheet selection button 401 is pressed, the CPU 201 (reception unit 204) accepts designation of the sheet cassette from which the sheet P is fed, the size of the sheet, and the type of sheet (cardboard, plain paper, thin paper, gloss paper).

When an inspection setting button 402 is pressed, the CPU 201 (UI display unit 203) displays the inspection setting UI 410, illustrated in FIG. 7B, on the display device 21.

When a cancel button 403 is pressed, the CPU 201 (setting unit 202) discards the contents set by the user on the printing setting screen 400 and returns to an initial setting screen (not illustrated).

When a print start button 404 is pressed, the CPU 201 starts printing without executing the image inspection.

As illustrated in FIG. 7B, the inspection setting UI 410 includes an image display area 411 and a detail setting area 412. The image display area 411 is an area for displaying a reference image as an image represented by the reference data 211, and accepting the setting for the inspection area as an area in which the inspection is performed in the reference image.

When a check box 420 is not checked, an image to be formed on the sheet P by the image formation device 30 is displayed in the image display area 411. Thus, the check box 420 is a control object for designating the image displayed in the image display area 411 to be the reference image or an image to be formed on the sheet P by the image formation device 30.

The detail setting area 412 changes to be operable when the check box 420 is checked. Specifically, a screen for setting the inspection content is displayed to accept the setting for the inspection content (condition).

A setting area 413*a* includes an area setting button 414*a* and a content designation menu 415*a*. The area setting button 414*a* displays the name of an inspection area (determination area). On the left side of the area setting button 414*a*, it is indicated that a first inspection area 421*a* is to be displayed with a dashed line. When the area setting button 414*a* is pressed, the CPU 201 (reception unit 204) accepts the designation of the first inspection area 421*a* input by the user in the image display area 411. For example, the CPU 201 (reception unit 204) sets an area of the image display area 411 touched by the user using his or her finger or a touch pen, to be the inspection area. For example, the CPU 201 (reception unit 204) sets a coordinate system with the origin at the upper left corner of the reference image, and stores the coordinates of the first inspection area 421*a* designated by the user, in the inspection setting data 212. The CPU 201 (UI display unit 203) may highlight and display the inspection area set by the user. The highlighted display includes surrounding the inspection area with a frame, displaying the inspection area in a strip shape, and the like. The content designation menu 415*a* displays candidates for the inspection content and accepts the designation of the inspection content by the user. The CPU 201 (reception unit 204) stores the inspection content selected from the content designation menu 415*a*, in the inspection setting data 212. When an add button 416*a* is pressed, the CPU 201 (the UI display unit 203, the reception unit 204) additionally displays the second content designation menu 415*a* to accept an additional inspection content.

Setting areas 413*b* and 413*c* also accept the inspection setting as with the setting area 413*a*. The setting area 413*b* includes an area setting button 414*b* for accepting a second inspection area 421*b*, and a content designation menu 415*b*. In this example, an add button 416*b* has already been pressed, and two inspection contents have been set. On the left side of the area setting button 414*b*, it is indicated that the second inspection area 421*b* is to be displayed with a one-dot chain line. In the image display area 411, the second inspection area 421*b* is displayed with the one-dot chain line.

A setting area 413*c* includes an area setting button 414*c* for accepting a third inspection area 421*c*, a content designation menu 415*c*, and an add button 416*c*. On the left side of the area setting button 414*c*, it is indicated that the third inspection area 421*c* is to be displayed with a two-dot chain line. The third inspection area 421*c* is displayed on the image display area 411 by a two-dot chain line.

An add button 417 is a button for adding a setting area 413. For example, in the default state, only the setting area 413*a* is displayed. When the add button 417 is pressed in this state, the CPU 201 (UI display unit 203) additionally displays the setting area 413*b*. When the add button 417 is further pressed in this state, the CPU 201 (UI display unit 203) additionally displays the setting area 413*c*.

When a return button 419 is pressed, the CPU 201 (UI display unit 203) returns to the print setting screen 400. When an inspection print start button 418 is pressed, the CPU 201 starts the inspection job for forming an image on the sheet P and inspecting the image formed on the sheet P.

Of the inspection contents, "overlap with ruled line or character" is for inspecting the overlap between the additional image and a ruled line and a character included in the preprinted image. Furthermore, "displacement relative to ruled line" is for inspecting displacement between the additional image and the ruled line included in the preprinted image. Furthermore, "excluded from inspection" is for not performing inspection in the corresponding inspection area.

The displayed order of the three setting areas 413*a* to 413*c* displayed in this example may correspond to the priority of image inspection. Specifically, the inspection content set in the setting area 413*a* displayed on the top is preferentially executed over the inspection content set in the setting area 413*b*, which is second from the top. The inspection content set in the setting area 413*b*, which is second from the top, is preferentially executed over the inspection content set in the setting area 413*c*, which is third from the top. In the example case illustrated in FIG. 7B, in the setting area 413*c*, the entire inspection target image is set to be an excluded-from-inspection area. In the excluded-from-inspection area, the inspection areas in the setting areas 413*a* and 413*b* are set. The priorities of the setting areas 413*a* and 413*b* are higher than that of the setting area 413*c*, and, thus, the inspection contents set in the setting areas 413*a* and 413*b* are executed.

Figure 8A:
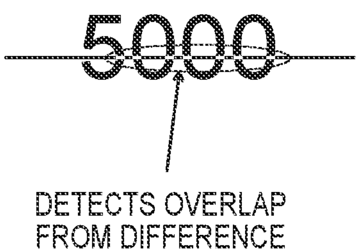
FIGS. 8A and 8B are explanatory views of image inspection.

FIG. 8A illustrates an example case when "overlap with ruled line or character" is detected. The preprinted image includes characters such as "billing amount" and "yen" and/or a ruled line. The additional image is a character "5000". In FIG. 8A, in an inspection area 501, the character "5000" overlaps with a ruled line. The CPU 201 (overlap determination unit 304) detects the overlap by calculating the difference between the additional image and the preprinted image.

Figure 8B:
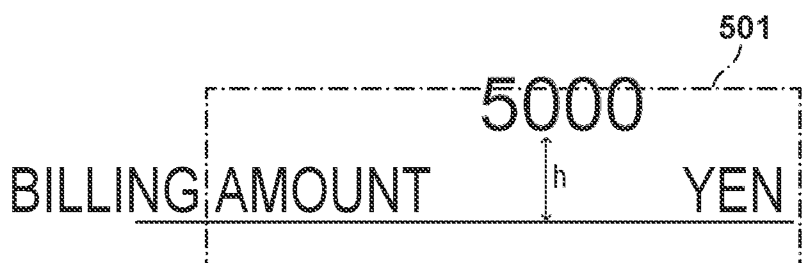

FIG. 8B illustrates an example case when "displacement relative to ruled line" is detected. The CPU 201 (displacement determination unit 305) calculates a distance h between the additional image and the preprinted image. If the distance h exceeds the threshold, the CPU 201 (displacement determination unit 305) determines that the additional image is displaced relative to the preprinted image.

Figure 9:
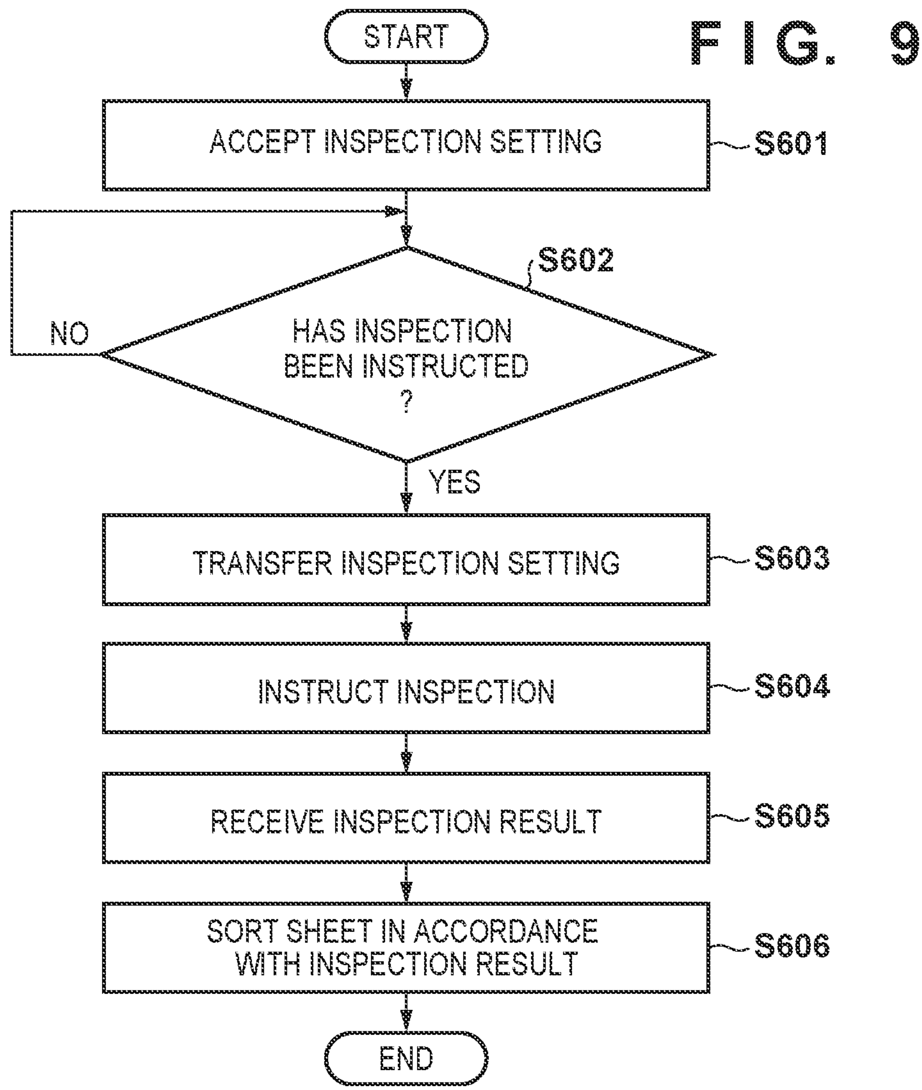
FIG. 9 is a flowchart illustrating an image inspection method.

FIG. 9 illustrates an image inspection method executed by the CPU 201 of the control device 40.

In S601, the CPU 201 (setting unit 202) accepts the inspection setting through the inspection setting UI 410.

In S602, the CPU 201 (inspection control unit 205) determines whether the start of the inspection job is instructed using the inspection print start button 418 on the inspection setting UI 410. When the start of the inspection job is instructed, the CPU 201 advances the processing to S603.

In S603, the CPU 201 (setting unit 202 or inspection control unit 205) transfers the inspection setting (inspection setting data 212) to the inspection controller 51 of the image inspection device 50.

In S604, the CPU 201 (inspection control unit 205) instructs the CPU 301 of the inspection controller 51 to inspect the image formed on the sheet P.

In S605, the CPU 201 (inspection control unit 205) receives the inspection result from the CPU 301 of the inspection controller 51.

In S606, the CPU 201 (job processing unit 206) sorts the sheet P in accordance with the inspection result. When the inspection result is not good, the CPU 201 controls the motor M1 and the solenoids 65*a* and 65*b* of the stacker device 60, to make the sheet P determined to be NG discharged to the NG tray 62.

When the inspection result is not good, the control device 40 may control the image formation device 30 to resolve the factor that has led to the not good result. Specifically, when the factor that has led to the not good result is the overlap as illustrated in FIG. 8A, the control device 40 may control the image formation device 30 to shift the formed image "5000" upward, for example.

When the factor that has led to the not good result is the displacement as illustrated in FIG. 8B, the control device 40 may control the image formation device 30 to shift the formed image "5000" downward, for example.

When the inspection result is good, the CPU 201 controls the motor M1 and the solenoids 65*a* and 65*b* of the stacker device 60, to make the sheet P determined to be good discharged to the large-capacity tray 61 or the post processing device 70.

Figure 10:
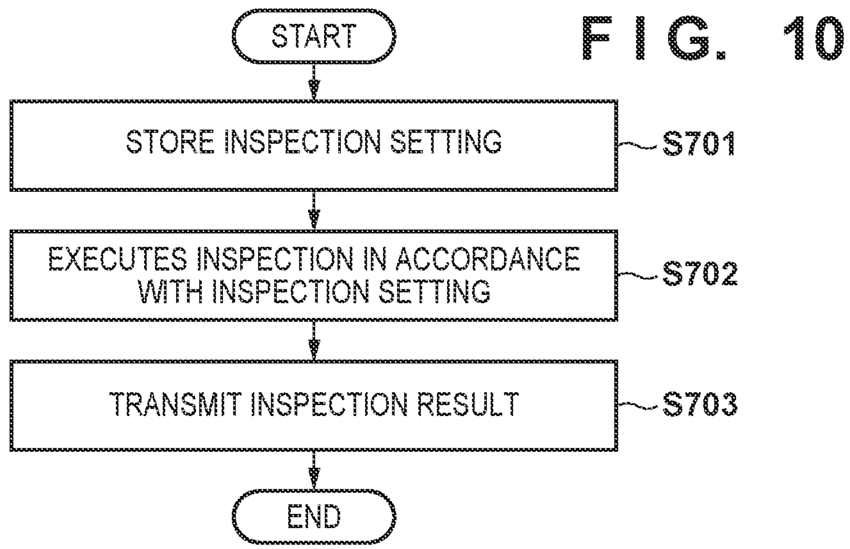
FIG. 10 is a flowchart illustrating an image inspection method.

FIG. 10 illustrates an image inspection method executed by the CPU 301 of the image inspection device 50. The CPU 301 starts the following processing upon being instructed or commanded to execute an inspection job from the control device 40.

In S701, the CPU 301 (inspection unit 302) receives the inspection setting (inspection setting data 212) from the control device 40, and stores the inspection setting in the memory 310.

In S702, the CPU 301 (inspection unit 302) executes the inspection in accordance with the inspection setting. The inspection unit 302 executes image inspection, in accordance with the inspection content designated by the inspection setting data 212, in the inspection area designated by the inspection setting data 212. For example, the inspection unit 302 executes the image inspection on the sheet P, by comparing the reference data 211 acquired from the preprinted sheet not including the additional image with the inspection image data 312 acquired from the sheet P. The reference data 211 may be part of the inspection setting data 212.

In S703, the CPU 301 (inspection unit 302) transmits the inspection result to the CPU 201. When continuously executing the printing and the image inspection on a plurality of sheets P, the CPU 301 repeatedly executes S702 and S703.

As described above, in the present embodiment, the reference data 211 is generated based on the first image data obtained by reading a first surface of the sheet P having the preprinted image, which is the second image, formed on the first surface but not having the additional image, which is the first image, formed on the first surface. Based on second image data obtained by reading the first surface of the sheet P having the preprinted image, which is the second image, formed on the first surface and having the additional image, which is the first image, formed on the first surface and based on image data corresponding to the reference data 211, the CPU 301 detects the relative position between the first image and the second image on the first surface of the sheet P on which the first image is formed. The relative position may be detected by detecting the overlap between the first image and the second image and/or by detecting the displacement of the first image relative to the second image, for example. With this configuration, the relative position between the image preprinted on the sheet P and the image additionally printed on the sheet P can be detected (inspected). Thus, it should be possible to prevent the inspection result from becoming good when the image preprinted on the sheet P and the image additionally printed on the sheet P are not in appropriate positional relationship. Thus, the image inspection can be more appropriately executed compared with the known techniques.

In addition, in the present embodiment, the image forming system 100 sets part of the preprinted sheet to be the inspection area, and executes the image inspection on the inspection area. With this configuration, the relative position between the image preprinted on the sheet P and the image additionally printed on the sheet P can be detected (inspected). Thus, it becomes possible to prevent the inspection result from becoming good when the image preprinted on the sheet P and the image additionally printed on the sheet P are not in appropriate positional relationship. Thus, the image inspection is appropriately executed compared with the known techniques. Furthermore, with the present embodiment, no image inspection is executed outside the inspection area, whereby erroneous detection is reduced and yield of the print product is improved.

In the present embodiment, the inspection setting and the sheet P sorting are executed by the control device 40, and an image inspection is executed by the image inspection device 50. However, this is merely an example. The function of the control device 40 may be incorporated into the controller of the image inspection device 50 or the image formation device 30.

In the present embodiment, the reference data 211 is generated with the sheet P, stacked on the sheet cassette 11, being conveyed to the image inspection device 50, but this is merely an example.

Figure 11:
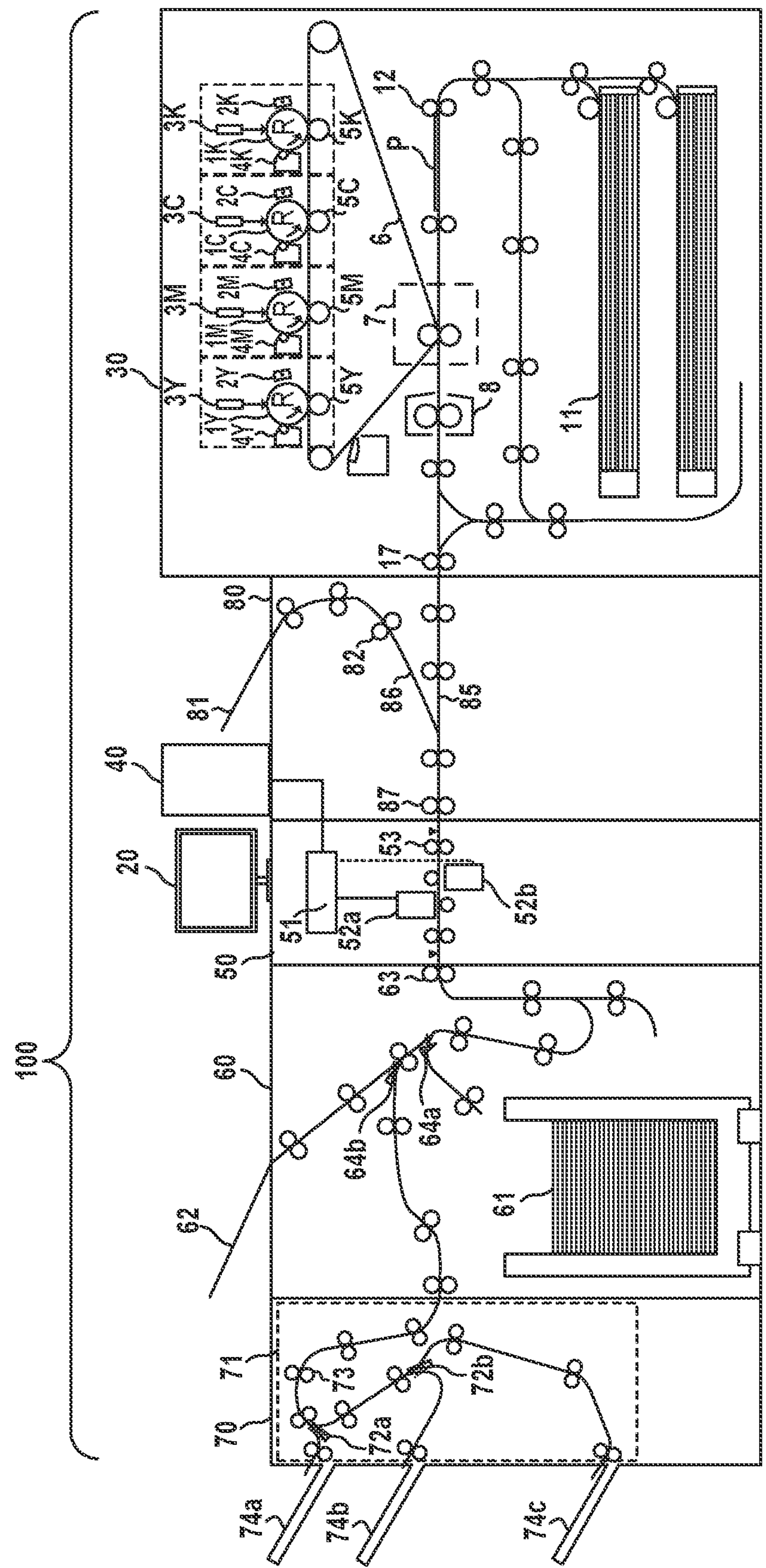
FIG. 11 is an explanatory view of an image inspection system.

For example, as illustrated in FIG. 11, the sheet P may be conveyed to the image inspection device 50 from an inserter device 80 provided between the image formation device 30 and the image inspection device 50 in the conveyance direction in which the sheet P is conveyed. Specifically, the sheet P stacked on an inserter tray 81 of the inserter device 80 may be conveyed to the image inspection device 50 by conveyance rollers 82 and discharge rollers 87. The reference data 211 is generated based on the result of reading the sheet P conveyed from the inserter tray 81. When the additional image is formed on the sheet P, the sheet P is conveyed from the sheet cassette 11, and the image formation device 30 forms the additional image on the sheet P. Between the image formation device 30 and the image inspection device 50 in the conveyance direction, a second conveyance guide 86 that guides the sheet P conveyed from the inserter tray 81 to the image inspection device 50 joins a first conveyance guide 85 that guides the sheet conveyed from the image formation device 30 to the image inspection device 50.

Technical Ideas Derived from Embodiments

Aspect A1

As illustrated in FIGS. 1 and 11, the image formation device 30 and the secondary transfer unit 7 are an example of an image forming unit that forms the first image (for example, the additional image) on the first surface of the first sheet. The second image (for example, the preprinted image) is formed on the first surface of the first sheet in advance. The image inspection device 50 and the image sensors 52*a* and 52*b* are an example of a reading unit that is provided on the downstream side of the image forming unit in the conveyance direction in which the first sheet is conveyed and is configured to read an image on the first sheet conveyed. The CPU 201 and the CPU 301 are an example of at least one processor. The at least one processor may be configured to generate reference data based on the result of reading, by the reading unit, the image on the first surface of the first sheet not having the first image formed. The at least one processor may be configured to generate first image data representing the result of reading, by the reading unit, the first surface of the first sheet having the first image formed on the first surface by the image forming unit. The at least one processor may be configured to determine, based on the reference data and the first image data, relative position between the first image and the second image on the first surface of the first sheet having the first image formed. Determining the relative position may include determining an overlap between the first image and the second image and/or determining displacement of the first image relative to the second image, for example. Determining the relative position may include determining the relative positional relationship between the positions of the first image and the second image.

Aspect A2

The sheet cassette 11 is an example of a stacking unit on which the first sheet is stacked. The conveyance rollers 12 are an example of a conveyance unit that conveys the first sheet stacked on the stacking unit to the image forming unit. A conveyor belt may be used in addition to or instead of the conveyance rollers 12.

For the at least one processor to generate the reference data, the first sheet may be conveyed from the stacking unit to the reading unit via the image forming unit. In this case, the image forming unit does not form, on the first surface of the first sheet, the first image for which the relative position is to be detected by the at least one processor. For the at least one processor to generate the first image data, the first sheet may be conveyed from the stacking unit to the reading unit via the image forming unit. In this case, the image forming unit forms the first image on the first surface of the first sheet conveyed.

Aspect A3

As illustrated in FIG. 11, the inserter tray 81 is an example of a first stacking unit on which the first sheet is stacked, the first stacking unit being provided between the image forming unit and the reading unit in the conveyance direction. The conveyance rollers 82 are an example of a first conveyance unit that conveys a first sheet stacked on the first stacking unit to a reading unit. The sheet cassette 11 is an example of a second stacking unit on which the first sheet is stacked. The conveyance rollers 12 are an example of a second conveyance unit that conveys the first sheet stacked on the second stacking unit to the image forming unit. The first conveyance guide 85 is an example of a first conveyance guide that guides the first sheet to be conveyed from the image forming unit to the reading unit. The second conveyance guide 86 is an example of a second conveyance guide that guides the first sheet to be conveyed from the first stacking unit to the reading unit. As illustrated in FIG. 11, the second conveyance guide may be provided to join the first conveyance guide at a position between the image forming unit and the reading unit. The at least one processor controls the first conveyance unit to convey the first sheet from the first stacking unit to the reading unit, for generating the reference data. The at least one processor, to generate first image data, controls the first conveyance unit to convey the first sheet from the second stacking unit to the reading unit via the image forming unit. The image forming unit forms the first image on the first surface of the first sheet that is conveyed from the second stacking unit.

Aspect A4

The sheet cassette 11 is an example of a first stacking unit on which the first sheet is stacked. The conveyance rollers 12 are an example of a first conveyance unit that conveys the first sheet stacked on the first stacking unit to the image forming unit. The at least one processor may control the first conveyance unit to convey the first sheet stacked on the first stacking unit to the image forming unit after the reference data has been generated. The image forming unit forms the first image on the first surface of the first sheet conveyed by the first conveyance unit, after the reference data has been generated.

Aspect A5

In Aspect A4, for the at least one processor to generate the reference data, the first sheet may be conveyed from the first stacking unit to the reading unit via the image forming unit. In this case, the image forming unit does not form, on the first surface of the first sheet, the first image for which the relative position is to be detected by the at least one processor. For the at least one processor to generate the first image data, the first sheet may be conveyed from the first stacking unit to the reading unit via the image forming unit. In this case, the image forming unit forms the first image on the first surface of the first sheet conveyed.

Aspect A6

In Aspect A4, the inserter tray 81 is an example of a second stacking unit on which the first sheet is stacked, the second stacking unit being provided between the image forming unit and the reading unit in the conveyance direction. The conveyance rollers 82 are an example of a second conveyance unit that conveys the first sheet stacked on the second stacking unit to the reading unit. The first conveyance guide 85 is an example of the first conveyance guide that guides the first sheet to be conveyed from the image forming unit to the reading unit. The second conveyance guide 86 is an example of the second conveyance guide that guides the first sheet to be conveyed from the second stacking unit to the reading unit. The second conveyance guide is provided to join the first conveyance guide at a position between the image forming unit and the reading unit. The at least one processor controls the second conveyance unit to convey the first sheet from the second stacking unit to the reading unit, for generating the reference data. The at least one processor, to generate first image data, controls the first conveyance unit to convey the first sheet from the first stacking unit to the reading unit via the image forming unit. The at least one processor makes the image forming unit form the first image on the first surface of the first sheet that is conveyed from the first stacking unit.

Aspect A7

The at least one processor may generate the reference data based on an average value of image data representing a result of reading, by the reading unit, an image on the first surface of the first sheet not having the first image formed, and image data obtained by reading, by the reading unit, a surface of a second sheet not having the first image formed. The second image is formed in advance on the surface of the second sheet. Thus, the reference data may be generated through a statistical method using a plurality of preprinted sheets.

Aspect A8

The operation unit 20 is an example of an input unit including a display unit (for example, the display device 21) that displays an image corresponding to the reference data. As illustrated in FIG. 7B, and the like, the input unit may accept selection of a determination area in which the relative position is to be determined, in the image displayed on the display unit. The at least one processor may detect, based on the reference data and the first image data, the relative position between the first image and the second image in the determination area on the first surface of the first sheet having the first image formed.

Aspect A9 As illustrated in FIG. 7B, and the like, the display unit may include a first display area that displays an image corresponding to the reference data and a second display area that displays a screen for accepting setting of the inspection content executed on the determination area.

Aspect A10

The second image may be a ruled line or a character.

Aspect A11

The at least one processor may determine, as the relative position, whether the first image and the second image overlap, based on the reference data and the first image data.

Aspect A12

The at least one processor may obtain a difference in pixel values between the reference data and the first image data. The at least one processor may determine whether the first image and the second image overlap based on the difference.

Aspect A13

The at least one processor may determine that the first image and the second image overlap when the difference is equal to or greater than a predetermined value. The at least one processor may determine that the first image and the second image do not overlap when the difference is less than the predetermined value.

Aspect A14

The at least one processor may determine a distance between the first image and the second image, as the relative position in the image on the first surface of the first sheet, based on the reference data and the first image data. The at least one processor may determine whether the distance determined is equal to or greater than a predetermined distance.

Aspect A15

The NG tray 62 is an example of a first discharge stacking unit to which the first sheet in which the first image and the second image are determined to overlap is discharged, the first discharge stacking unit being provided on the downstream side of the reading unit in the conveyance direction. The large-capacity tray 61 is an example of a second discharge stacking unit to which the first sheet in which the first image and the second image are determined not to overlap is discharged, the second discharge stacking unit being provided on the downstream side of the reading unit in the conveyance direction.

Aspect A16

The display device 21 is an example of a notification unit that provides notification of information indicating a result of determining, as the relative position, whether the first image and the second image overlap.

Aspect A17

The at least one processor may determine, as the relative position, a distance between the first image and the second image, based on the reference data and the first image data. The at least one processor may determine whether the distance determined is equal to or greater than a predetermined distance.

Aspect A18

The NG tray 62 is an example of a first discharge tray on which a sheet in which the distance is determined to be equal to or greater than the predetermined distance, is stacked, the first discharge tray being provided on the downstream side of the reading unit in the conveyance direction. The large-capacity tray 61 is an example of a second discharge tray on which a sheet in which the distance determined is determined not to be equal to or greater than the predetermined distance is stacked, the second discharge tray being provided on the downstream side of the reading unit in the conveyance direction.

Aspect A19

The display device 21 is an example of a notification unit that provides notification of information indicating a result of determining whether the distance determined is equal to or greater than the predetermined distance.

Aspect B1

As illustrated in FIG. 1, and the like, the image sensors **52*a* and 52*b* are an example of the reading unit that reads the sheet P (for example, the preprinted sheet) on which an image is formed in advance, to generate image data to be the reference data 211. The CPU 201 and the setting unit 202 are an example of a setting unit that sets an inspection area (for example, the first inspection area 421*a*) to part of the image on the sheet P. The image formation device 30 is an example of an image forming unit that forms the additional image on the sheet P. The image inspection device 50 functions as an inspection unit that executes image inspection, focusing on the inspection area set by the setting unit for the inspection data (for example, the inspection image data 312) and the reference data 211. The inspection data is image data generated, by the reading unit reading the sheet P, on which the additional image is formed. The reference data 211** is image data generated by reading the sheet P on which the image is formed in advance. In this manner, with the present embodiment, the inspection area is set to part of the image on the sheet P. Thus, with the present embodiment, the image inspection can be executed more appropriately than the known techniques with which the inspection area is always set to be the entire image. For example, the image inspection is executed focusing on the inspection area explicitly set by the user, and thus minor defect outside the inspection area would not be detected. Furthermore, the image inspection is executed focusing on the inspection area being set, and thus is appropriately executed even in a case when an image with a low density is preprinted entirely over the sheet.

Aspect B2

The display device 21 is an example of a display unit that displays an image of the sheet P based on the reference data 211. As illustrated as an example in FIG. 7B, the CPU 201 (setting unit 202) is configured to accept the setting of the inspection area in a state in which the image of the sheet is displayed on the display unit. Thus, the user can set the inspection area appropriately or easily.

Aspect B3

The input device 22 is an example of a touch panel sensor provided on the upper side of the display unit. The CPU 201 (setting unit 202) may set the inspection area in response to a touch input detected by the touch panel sensor. This should enable the user to set the inspection area easily.

Aspect B4

The display unit (for example, the display device 21, the inspection setting UI 410) may include a first display area (for example, the image display area 411) displaying an image of the sheet P. The display unit (for example, the display device 21, the inspection setting UI 410) may include a second display area (for example, the detail setting area 412) displaying a user interface accepting designation of the inspection content executed on the inspection area.

Aspects B5 to B7

The user interface may include an area (for example, the area setting button 414*a*) displaying identification information on a first inspection area set in the image of the sheet. The user interface may include an area (for example, the content designation menu 415*a*) selectively displaying a first inspection content executed on the first inspection area. The user interface may include an area (for example, the area setting button 414*b*) displaying identification information on a second inspection area set in the image of the sheet. The user interface may further include an area (for example, the content designation menu 415*a*) selectively displaying a second inspection content executed on the second inspection area. This should enable the user to easily set a plurality of inspection areas and an inspection content. The inspection unit (for example, the inspection unit 302) may execute the first inspection content set to the first inspection area preferentially over the second inspection content set to the second inspection area. This should enable the user to execute complicated image inspection utilizing the priority order.

Aspects B8 and B9

The user interface may include an area (for example, the area setting button 414*c*) displaying identification information on a third inspection area set in the image of the sheet. The user interface may include an area (for example, the content designation menu 415*c*) selectively displaying the third inspection content executed on the third inspection area. The inspection unit 302 may execute the first inspection content set to the first inspection area preferentially over the second inspection content set to the second inspection area and a third inspection content set to the third inspection area. The inspection unit 302 may execute the second inspection content set to the second inspection area preferentially over the third inspection content set to the third inspection area.

Aspect B10

The area, on the user interface, in which the inspection content is displayed to be selectable may be a list or a menu displaying a plurality of inspection contents as selectable candidates. This should enable the user to determine and to select the inspection content easily.

Aspects B11 and B12

The inspection unit 302 may determine whether the additional image overlaps on the image formed in advance on the sheet P, by comparing the reference data 211 and the inspection data in the inspection area. The image formed in advance on the sheet P may be a ruled line or a character, for example.

Aspect B13

The inspection unit 302 may obtain a difference between the reference data 211 and the inspection data in the inspection area, and determine, based on the difference, the print quality of the additional image formed on the sheet. This difference may be used for detecting the overlap between the two images described above.

Aspects B14 and B15

The inspection unit 302 may determine whether the additional image is displaced relative to a ruled line formed in advance on the sheet P, by comparing the reference data 211 and the inspection data in the inspection area. The inspection unit 302 may compare the reference data 211 and the inspection data in the inspection area to obtain the distance h between the ruled line formed on the sheet P in advance and the additional image, and determine whether the distance h exceeds a threshold.

Aspect B16

The large-capacity tray 61 and the trays 74*a* to 74*c* are an example of a first stacking unit on which the sheet P determined to be good by the inspection unit is stacked. The NG tray 62 is an example of a second stacking unit on which a sheet determined to be not good by the inspection unit is stacked.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming system comprising:

a printer configured to form a first image on a first surface of a first sheet, the first surface of the first sheet having a second image formed in advance;

an image sensor provided on a downstream side of the printer in a conveyance direction in which the first sheet is conveyed, and configured to read an image on the first sheet conveyed;

at least one processor configured:

to generate reference data based on a result of reading, by the image sensor, an image on the first surface of the first sheet on which the first image is not formed;

to generate first image data that represents a result of reading, by the image sensor, an image on the first surface of the first sheet having the first image formed on the first surface by the printer; and to determine, based on the reference data and the first image data, a relative position between the first image and the second image on the first surface of the first sheet on which the first image is formed; and an input unit including a display configured to display an image that includes the second image and does not include the first image, wherein the input unit accepts selection of a determination area by a user in the image displayed on the display, the determination area being an area in which the relative position is to be determined, and wherein the at least one processor determines the relative position between the first image and the second image in the determination area on the first surface of the first sheet on which the first image is formed, based on the reference data and the first image data.

2. The image forming system according to claim 1, further comprising:

a stacking tray on which the first sheet is stacked; and a conveyance roller configured to convey the first sheet stacked on the stacking tray to the printer, wherein the printer does not form the first image on the first surface of the first sheet, in a case when the first sheet is conveyed from the stacking tray to the image sensor via the printer for the at least one processor generating the reference data, and wherein the printer forms the first image on the first surface of the first sheet conveyed, in a case when the first sheet is conveyed from the stacking tray to the image sensor via the image forming unit for the at least one processor to generate the first image data.

3. The image forming system according to claim 1, further comprising:

a first stacking tray on which the first sheet is stacked, and provided between the printer and image sensor in the conveyance direction;

a first conveyance roller configured to convey the first sheet stacked on the first stacking unit to the reading unit;

a second stacking tray on which the first sheet is stacked;

a second conveyance roller configured to convey the first sheet stacked on the second stacking tray to the printer;

a first conveyance guide configured to guide the first sheet conveyed from the printer to the image sensor; and a second conveyance guide configured to guide the first sheet conveyed from the printer to the image sensor, wherein the second conveyance guide joins the first conveyance guide at a position between the printer and the image sensor, wherein the at least one processor, to generate the reference data, controls the second conveyance roller to convey the first sheet from the first stacking tray to the image sensor, and wherein the at least one processor, to generate the first image data, controls the first conveyance roller to convey the first sheet from the second stacking tray to the image sensor via the printer, and the printer forms the first image on the first surface of the first sheet conveyed from the second stacking tray.

4. The image forming system according to claim 1, further comprising:

a first stacking tray on which the first sheet is stacked; and a first conveyance roller configured to convey the first sheet stacked on the first stacking tray to the printer, wherein the at least one processor controls the first conveyance roller to convey the first sheet stacked on the first stacking tray to the printer after the reference data has been generated, and wherein the printer forms the first image on the first surface of the first sheet conveyed by the first conveyance roller after the reference data has been generated.

5. The image forming system according to claim 4, wherein the printer does not form the first image on the first surface of the first sheet, when the first sheet is conveyed from the first stacking tray to the image sensor via the printer for the at least one processor generating the reference data, and wherein the printer forms the first image on the first surface of the first sheet conveyed, when the first sheet is conveyed from the first stacking tray to the image sensor via the printer for the at least one processor generating the first image data.

6. The image forming system according to claim 1, wherein the at least one processor generates the reference data based on an average value between image data representing a result of reading, by the image sensor, an image on the first surface of the first sheet on which the first image is not formed, and image data representing a result of reading by reading, by the image sensor, an image on a surface of a second sheet on which the first image is not formed, the surface of the second sheet having the second image formed in advance.

7. The image forming system according to claim 1, wherein the display includes a first display area in which an image that includes the second image and does not include the first image is displayed, and a second display area in which a screen accepting setting by the user for content of an inspection to be executed on the determination area is displayed.

8. The image forming system according to claim 1, wherein the second image is a ruled line or a character.

9. The image forming system according to claim 1, wherein the at least one processor determines, as the relative position, whether the first image and the second image overlap, based on the reference data and the first image data.

10. The image forming system according to claim 9, wherein the at least one processor obtains a difference in pixel values between the reference data and the first image data, and determines whether the first image and the second image overlap based on the difference.

11. The image forming system according to claim 10, wherein the at least one processor determines that the first image and the second image overlap when the difference is equal to or greater than a predetermined value, and determines that the first image and the second image do not overlap when the difference is less than the predetermined value.

12. The image forming system according to claim 9, further comprising:

a first discharge stacking tray provided on the downstream side of image sensor in the conveyance direction, and configured such that the first sheet in which the first image and the second image are determined to overlap is discharged to the first discharge stacking tray; and a second discharge stacking tray provided on the downstream side of image sensor in the conveyance direction, and configured such that the first sheet in which the first image and the second image are determined not to overlap is discharged to the second discharge stacking tray.

13. The image forming system according to claim 9, further comprising a notification display configured to display notification of information indicating a result of determining, as the relative position, whether the first image and the second image overlap.

14. The image forming system according to claim 9, wherein the at least one processor determines, as the relative position, a distance between the first image and the second image, based on the reference data and the first image data, and wherein the at least one processor determines whether the distance determined is equal to or longer than a predetermined distance.

15. The image forming system according to claim 14, further comprising:

a first discharge tray provided on the downstream side of the image sensor in the conveyance direction, and configured such that a sheet in which the distance determined is determined to be equal to or longer than the predetermined distance is stacked on the first discharge tray, and a second discharge tray provided on the downstream side of the image sensor in the conveyance direction, and configured such that a sheet in which the distance determined is determined not to be equal to or longer than the predetermined distance is stacked on the second discharge tray.

16. The image forming system according to claim 14, further comprising a notification unit configured to provide notification of information indicating a result of determining whether the distance determined is equal to or longer than the predetermined distance.

* * * * *